S. POLAND.
REWINDER.
APPLICATION FILED MAR. 2, 1914.
1,108,619.
Patented Aug. 25, 1914.
2 SHEETS—SHEET 1.
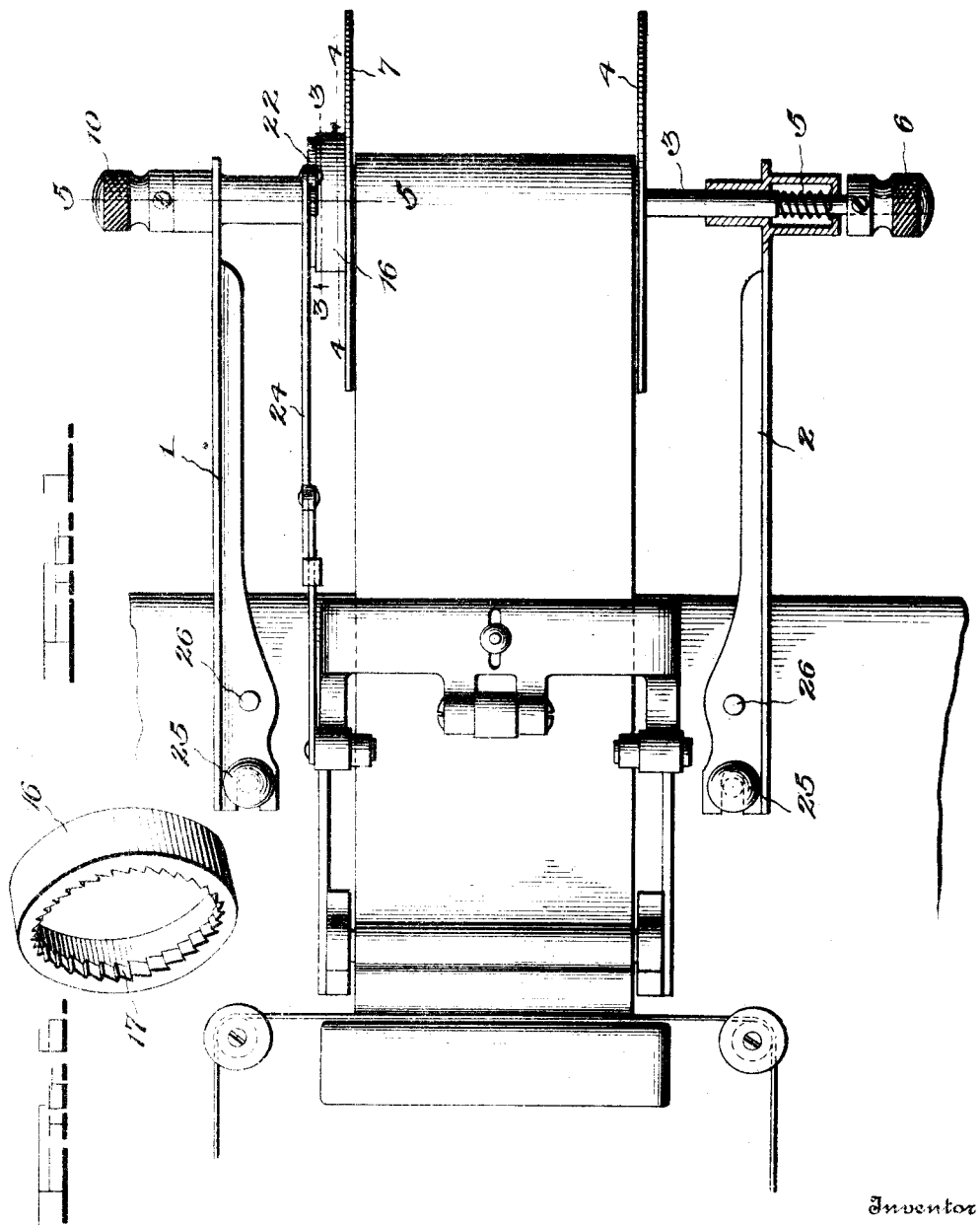
Witnesses
Edward A. Conroy
Lester L. Sargent
Inventor
S. Poland,
By Jerry A. Mathew,
Attorney

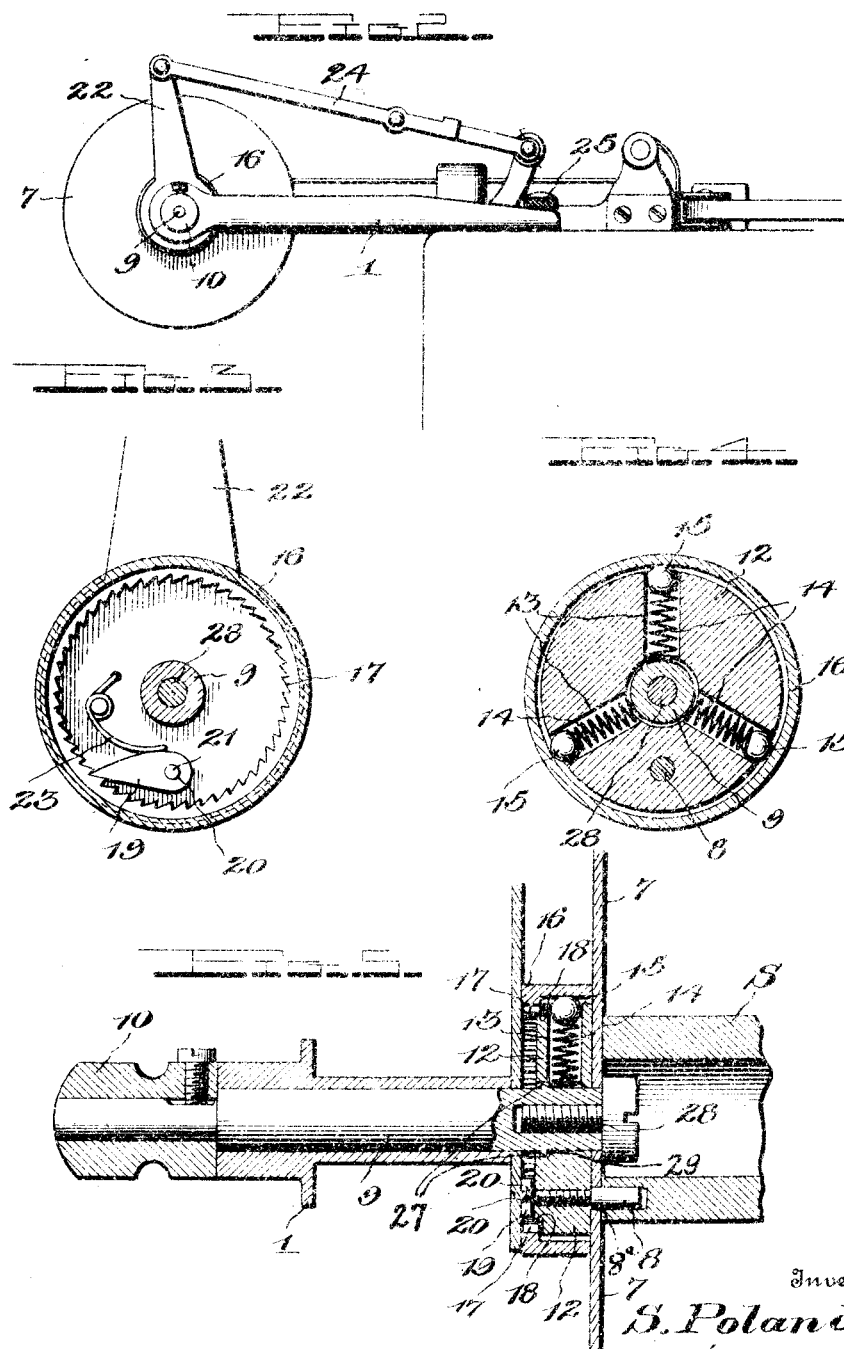

UNITED STATES PATENT OFFICE.

SPRIGG POLAND, OF OLNEY, ILLINOIS.

REWINDER.

1,108,619.

Specification of Letters Patent.   Patented Aug. 25, 1914.

Application filed March 2, 1914.   Serial No. 822,092.

*To all whom it may concern:*

Be it known that I, SPRIGG POLAND, a citizen of the United States, residing at Olney, in the county of Richland and State of Illinois, have invented a new and useful Rewinder, of which the following is a specification.

My invention relates to an improved rewinder for typewriting machines, and in particular, my object is to improve upon the rewinding mechanism disclosed in Patent 980,275, relating to rewinder and reel mechanism for stenographic typewriters, or stenotype machines.

It is the object of my invention to provide a rewinding mechanism that will properly roll the paper at any rate of speed; that will roll the paper either on a small spool or large spool; and that will operate positively and evenly from a small spool to a large one, and which, beginning with a small spool will continue to actuate the spool until a large roll is reached, even though the speed at which the paper is fed through the machine remains constant; to provide novel ratchet, clutch and anti-friction mechanism with novel features of construction and combination of elements, as hereinafter described, claimed and illustrated.

In the accompanying drawings, to which reference is made, Figure 1 is a top plan view of a portion of a stenotype machine with my rewinder attached, part of same being shown in section; Fig. 2 is a side elevation of my invention; Fig. 3 is a section on line 3—3 of Fig. 1, showing the ratchet mechanism; Fig. 4 is a section on line 4—4 of Fig. 1, showing the anti-friction mechanism in disk 12; Fig. 5 is a vertical section through the median line of the reel disk; Fig. 6 is a perspective of ring 16.

Like characters of reference refer to like parts throughout the several views.

Referring to the accompanying drawings, I provide any suitable brackets or arms 1 and 2. In arm 2 is mounted a shaft 3, supporting a reel disk 4, normally pressed inward by a spring 5, preferably as shown in Fig. 1. A thumb nut is secured to the opposite end of the shaft, numbered 6.

I disclaim any invention or novelty in arm 2 and spring 5.

On arm 1 is mounted an opposite reel disk 7 having an offset orifice 8ª through which projects a pin 8 to engage with and actuate the paper spool, indicated by S, the reel disk being mounted on a shaft 9 at the outer end of which is a thumb nut 10. To this extent the mechanism resembles what has heretofore been invented. My invention relates principally to the novel elements and operation hereinafter described and disclosed in the drawings. I provide an inner, spool-actuating disk 12, in which is mounted pin 8 which engages with the core or spool S on which the paper is rewound. Disk 12 is provided with a plurality of radial channels 13, in which are positioned small spiral springs 14 and balls 15, bearing against ring 16 (Fig. 4). Ring 16 is provided with a ratch portion 17, adjacent groove 18 in disk 12, as shown in Fig. 5 and Fig. 6. A pawl 19, having a perforation 20, into which projects a lug or pin 21 which is mounted on a disk arm 22, is thereby actuated by the disk arm, as will be understood by a reference to Figs. 3 and 4. A spring 23 mounted on disk arm 22, at a suitable distance from pin 21, presses against pawl 19, whereby it is kept in operative engagement with ratch 17 of ring 16 to insure a positive drive. Disk arm 22 is intermittently actuated by arm 24, which member is pivotally attached to it as shown in Fig. 2. The means for operating arm 24 I do not claim as my invention.

My rewinder is attached to a stenographic typewriting machine, as shown in Fig. 1, by brackets 1 and 2, screw nuts 25 and small lugs 26 protruding through corresponding perforations in the arm or bracket members, to eliminate any side movement of the attachment.

Pawl 19, disk arm 12, ratchet ring 16 and reel disk 7 are retained in operative engagement by means of screw 28 in shaft 9 on which the foregoing members are mounted, as shown. Pin 8 in disk 12, projects through perforation 8ª of reel disk 7, to actuate paper spool S. A collar or flange 27 on shaft 9 is adapted to frictionally engage with annular shoulder 29 in disk 12, as a clutch.

Movement of the arm 22 will move the ring 16 through the pawl 19 and ratchet 17 and this movement of the ring 16 will communicate motion to the disk 12 or to the reel S, caused by the outward pressure of springs 14, against balls 15 and in turn balls 15 pressing against the inside circumference of ring 16.

What I claim is:

1. In a mechanism of the character described, the combination of a supporting bracket arm, means for attaching the said member to a typewriting machine, a shaft in the outer end of the bracket arm, a reel disk mounted thereon, a spool-actuating disk adjacent the reel disk and having radial channels, springs mounted in the channels, balls against which the springs press, a ring inclosing the spool-actuating disk and driven by the balls, the aforesaid ring also having a ratch portion, and means engageable with the ratch to prevent the device from being driven in both directions.

2. In a mechanism of the character described, the combination of a bracket arm adapted to be attached to a typewriting machine, a shaft mounted in said arm, a reel disk mounted on the shaft, an inner disk adjacent the reel disk and having a pin projecting therethrough to engage with and actuate a reel or spool, the inner disk having radial channels, a spring and a ball against which the spring presses within each of the aforesaid channels, a ring within which the aforesaid inner disk is mounted, said ring having a ratchet portion, a pawl engageable with the aforesaid ratchet portion of the ring, a disk arm mounted adjacent the aforesaid ring, means for maintaining the pawl in engagement with the ratch, a longitudinally reciprocable arm pivotally attached to the disk arm to actuate same, and means for securing the members set forth in operative engagement.

In testimony whereof I hereunto set my hand, in the presence of two witnesses.

SPRIGG POLAND.

Witnesses:
D. P. MOORE,
H. G. PRIEBLE.